G. M. EATON.
DYNAMO ELECTRIC MACHINE.
APPLICATION FILED MAY 4, 1915.
1,267,993.
Patented May 28, 1918.
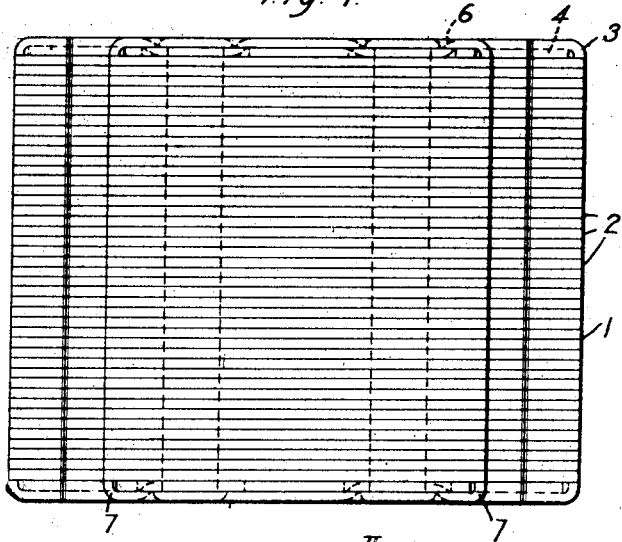
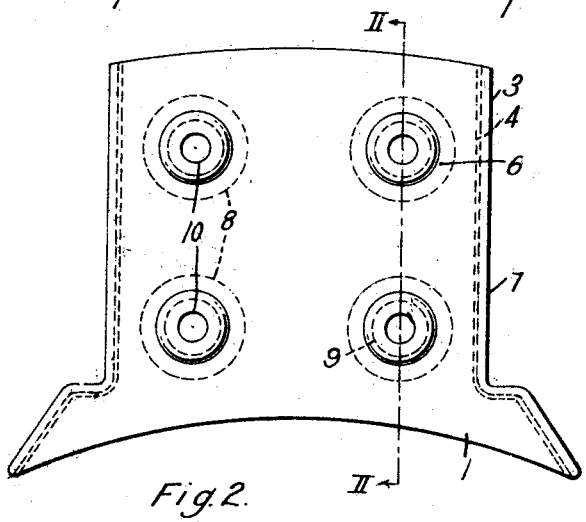
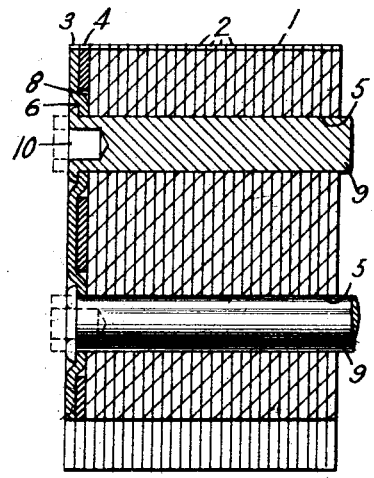
WITNESSES:
Fred H Miller
O. W. Kennedy
INVENTOR
George M. Eaton
BY
Wesley G Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,267,993. Specification of Letters Patent. Patented May 28, 1918.

Application filed May 4, 1915. Serial No. 25,716.

*To all whom it may concern:*

Be it known that I, GEORGE M. EATON, a citizen of the United States, and a resident of Pittsburgh, in the county of Allegheny and State of Pennsylvania, have invented a new and useful Improvement in Dynamo-Electric Machines, of which the following is a specification.

My invention relates to field-magnet pole pieces for dynamo-electric machines, and it has particular reference to pole pieces built up of laminations that are secured together by rivets or other similar means.

Heretofore, in constructing pole pieces of the above-mentioned type, it has been customary to spot-weld a number of laminations adjacent to the ends of the pole pieces and then countersink for the rivet heads in order to insure that the faces of the pole pieces through which the rivets pass would present a smooth and unbroken surface. It was also found necessary to round off the corners of the completed pole pieces by grinding so that no sharp edges would be presented to the field-magnet coils surrounding the pole pieces.

By my invention, I propose to eliminate the several steps of spot-welding, countersinking for the rivet heads and rounding off the edges of the pole pieces, by forming the end laminations of each pole piece with suitable depressed portions adapted to receive the rivet heads and with rounded flanged portions on opposite sides thereof. As the laminations are usually punched from sheet metal, it is comparatively easy to provide end laminations of the above described type by pressing or other similar means.

In the accompanying drawings, Figure 1 is a plan view of a field magnet pole piece constructed in accordance with my invention; Fig. 2 is a side elevational view of the pole piece shown in Fig. 1 and Fig. 3 is a fragmentary sectional view along the line II—II of Fig. 2.

The field-magnet pole piece 1 comprises a plurality of intermediate plate members 2 and end plate members 3 and 4. The intermediate members 2 are similar in form and are provided with a plurality of circular openings 5 that are in alinement when the plates are assembled. The end plate members 3 are similar in form to the plate members 2 and are provided with a plurality of inwardly extending annular depressed portions 6, the inner peripheries of which are adapted to register with the openings 5. The end plate members 3 are also provided with oppositely disposed rounded flange portions 7 which extend inwardly substantially the same amount as the depressed portions 6. The plate members 4 are provided with a plurality of circular openings 8 of substantially the same diameter as the outer peripheries of the depressed portions 6. The plate members 4 are narrower than the end plates 3 and are adapted to fit between the flange portions 7.

When the laminations are assembled, the members 4 are interposed between the plate members 2 and end members 3 so that the depressed portions 6 occupy the openings 8. A plurality of rivets 9 are provided at their ends with cup-shaped portions 10, and, when inserted within the openings 5, the end portions of the rivets extend somewhat beyond the faces of the end members 3, as shown by dotted lines in Fig. 3. The outer edges of the cup shaped portions 10 are bent over or upset in any suitable manner to lie within the depressed portion 6, thereby firmly securing the rivets 9 in the openings 5. The up-set portions of the rivets 9 form a smooth and substantially continuous surface with the end members 3 and as the rounded flange portions 7 are even with the plate members 2, the pole piece presents no projections or sharp edges which might prove injurious to the surrounding field-magnet coils.

While I have shown my invention in its preferred form, it is not so limited but is capable of various changes and modifications within the scope of the appended claims.

I claim as my invention:

1. A laminated structure comprising a plurality of assembled plates having alined openings, a plurality of end plates provided with depressed portions surrounding said alined openings, and retaining members extending through said openings, the end portions of said retaining members occupying the recesses provided by the said annular depressed portions.

2. A laminated structure comprising a plurality of assembled plates having alined openings, of a plurality of end plates provided with annular depressed portions surrounding said alined openings, and rivets extending through said openings the ends of which are upset and occupy the recesses provided by the said annular depressed portions.

3. A laminated structure comprising a plurality of assembled plates having alined openings, a plurality of end plates provided with annular depressed portions adapted to register with said alined openings, a plurality of plates interposed between said end plates and said assembled plates and provided with openings to receive the said annular depressed portions, and retaining means passing through said openings and the ends of which occupy the recesses provided by the said depressed portions.

4. A laminated structure comprising a group of plates having alined openings and constituting a body portion, outer plates having openings registering with the aforesaid openings and depressed portions surrounding said openings, intermediate plates having larger openings than those in said body portion that are occupied by the said depressed portions in the outer plates, and securing means passing through said openings and having their ends seated in the recesses provided by the depressed portions.

5. A laminated structure comprising a plurality of side-by-side body plates of like dimensions, end plates of less width than said body plates and outer plates having their edges bent into engagement with the adjacent faces of the outermost body plates to embrace the edges of the narrow end plates.

6. A laminated structure comprising a plurality of side-by-side plates, the portions adjacent to edges of the outer plates being bent to form flanges that embrace the edges of the adjacent plates, and the plates embraced by said flanges being of smaller dimensions than the remaining plates.

In testimony whereof, I have hereunto subscribed my name this 30th day of April 1915.

GEORGE M. EATON.

Copies of this patent may be obtained for five cents each, by addressing the "Commissioner of Patents, Washington, D. C."